United States Patent
Ashok et al.

(10) Patent No.: US 10,503,553 B1
(45) Date of Patent: Dec. 10, 2019

(54) CUSTOMIZED COORDINATED SCALING OF CLOUD-BASED APPLICATIONS AND BACKEND RESOURCES

(71) Applicant: FMR LLC, Boston, MA (US)

(72) Inventors: Rohith Ashok, Medway, MA (US); Stein Eriksen, Jefferson, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/273,994

(22) Filed: Feb. 12, 2019

(51) Int. Cl.
*G06F 9/46* (2006.01)
*G06F 9/50* (2006.01)
*G06F 11/30* (2006.01)
*G06F 11/34* (2006.01)

(52) U.S. Cl.
CPC ........ *G06F 9/5011* (2013.01); *G06F 11/3024* (2013.01); *G06F 11/3433* (2013.01)

(58) Field of Classification Search
None
See application file for complete search history.

(56) References Cited

U.S. PATENT DOCUMENTS

| | | | |
|---|---|---|---|
| 8,997,107 B2 | 3/2015 | Jain | |
| 9,058,213 B2 | 6/2015 | Yaffe | |
| 9,590,879 B2 | 3/2017 | Wray | |
| 9,612,865 B2 * | 4/2017 | Cao | G06F 9/4818 |
| 9,830,192 B1 | 11/2017 | Crouchman et al. | |
| 9,916,135 B2 | 3/2018 | Dube et al. | |
| 2016/0171417 A1 * | 6/2016 | Sankaralingham | G06Q 10/06398 705/7.42 |
| 2016/0246717 A1 * | 8/2016 | Patil | G06F 12/0806 |
| 2018/0097744 A1 * | 4/2018 | Hu | H04L 47/823 |

OTHER PUBLICATIONS

De Valence, Phil, "High-Performance Mainframe Workloads on AWS with Cloud-Native Heirloom PaaS," AWS Partner Network (APN) Blog, Jun. 12, 2018, available at https://aws.amazon.com/blogs/apn/high-performance-mainframe-workloads-on-aws-with-cloud-native-heirloom-paas/, 10 pages.

* cited by examiner

*Primary Examiner* — Wissam Rashid
(74) *Attorney, Agent, or Firm* — Proskauer Rose LLP (57) ABSTRACT

Methods and apparatuses are described for coordinated scaling of a cloud-based software application and a backend resource in a networked computing environment. A server captures resource usage metrics associated with cloud-based applications. The server captures resource usage metrics associated with backend resources that correspond to the cloud-based applications. The server aggregates the resource usage metrics to generate a set of integrated application-level resource usage metrics. The server determines a current resource consumption level based upon the integrated application-level resource usage metrics for the cloud-based software application. The server compares the current resource consumption level to a desired resource consumption level. The server computing device changes resource availability for the cloud-based software application, based upon a difference between the current resource consumption level and the desired resource consumption level.

28 Claims, 3 Drawing Sheets

CUSTOMIZED COORDINATED SCALING OF CLOUD-BASED APPLICATIONS AND BACKEND RESOURCES

TECHNICAL FIELD

This application relates generally to methods and apparatuses, including computer program products, for coordinated scaling of a cloud-based application and a backend resource in a networked computing environment.

BACKGROUND

Software containers have emerged as an efficient and scalable way to deliver packaged software application code for execution in an isolated environment—also known as operating system virtualization. Typically, a software container is deployed for execution as an independent process running on a server infrastructure (e.g., cloud environment). Each software container includes software elements such as code, runtime, system tools, settings, libraries and the like that enable execution of the underlying application. Examples of currently-available software container projects include Docker™, Open Container Initiative (OCI), and Amazon™ EC2 Containers. These types of cloud-based systems provide fast, horizontal scaling of multiple instances of an application—including the on-the-fly creation of new instances or containers—that can work as a logical unit to ensure availability of the application to end users, especially during periods of increased demand.

In some cases, these cloud-based software applications utilize more traditional backend resources, such as mainframe databases and other services—often in a shared approach, in that multiple instances of a cloud-based software application, or multiple different cloud-based software applications, may rely on the same backend resource. Generally, these types of backend resources—particularly mainframes—operate using a vertical scaling approach, in that additional resources such as CPU, memory and/or disk space are added in order to satisfy expected or sudden increases in demand for resources. However, backend environments are typically static—there are a fixed number of computing devices available to service the application environment, and once the resources of these computing devices have been maximized, additional load from the application environment results in decreased performance and even interruptions in availability of the applications.

Computing environments that comprise a mix of horizontal scaling in the front end and vertical scaling in the back end present some significant technical challenges. As noted above, cloud-based application environments can create a variable number of instances to service end-user demand, and each instance can have its own connection to backend services and data sources as well as each instance managing its own connection management system. Conversely, backend environments generally have a fixed number of computing devices, each of which also has its own connection management. Also, cloud-based application environments generally scale without knowledge of resource availability or resource impact on a shared backend environment—this can be problematic because, while the backend can scale, the computing devices and their hardware resources are eventually finite. In addition, many or all applications and services in the cloud-based application environment can use the same backend resources, while the backend environment is typically not configured to react quickly or adeptly in response to competing demands for scaling from the front end. Finally, scaling decisions on each side—both front-end and back-end—are made locally, which can result in conflicts and unsynchronized scaling.

SUMMARY

Therefore, what is needed are methods and systems that dynamically and automatically synchronize and control resource scaling in a networked computing environment that includes a cloud-based application environment configured to scale horizontally which utilizes a backend resource environment that is configured to scale vertically. The techniques described herein advantageously provide for real-time analysis and aggregation of scaling data (e.g., hardware resource usage, network resource usage, transaction cost, and the like) across the front-end and back-end computing environments, and automatic control of scaling decisions based upon the resource usage analysis. The invention overcomes a wide range of technical challenges of existing resource scaling and management platforms, such as:

Network latency—the present techniques tag application metadata with a network latency SLA. In times of network congestion, the SLA can be used to ramp down other lower SLA applications, while keeping their main SLAB intact. The system can decide to do this to relieve network congestion for other applications. The congestion could either be occurring in the front end incoming traffic or more likely to the backend constrained resources.

Back end costs—some backend resource costs change based on the real-time peak consumption of the resource. The methods and systems described herein, through the applications, can monitor that cost and while not reduce it, mitigate the need by balancing down applications more aggressively in favor of others.

Prioritization—the systems and methods can categorize applications with a high-level priority. This is intended as a primary score for the scaler, representing the application's level of importance in the overall scheme of applications. The techniques can provide for resource focus on these applications above others in times of severe congestion or conflict. This is especially critical if backend resources go down or other capacity is lost.

The invention, in one aspect, features a system for coordinated scaling of a cloud-based software application and a backend resource in a networked computing environment. The system comprises a server computing device including a memory that stores computer-executable instructions and a processor that executes the computer-executable instructions to capture resource usage metrics associated with one or more cloud-based software applications, each cloud-based software application comprising one or more application containers. The server computing device captures resource usage metrics associated with one or more backend resources that correspond to the one or more cloud-based software applications. The server computing device aggregates the resource usage metrics associated with the one or more cloud-based software applications and the resource usage metrics associated with the one or more backend resources to generate a set of integrated application-level resource usage metrics. The server computing device determines, for each of the one or more cloud-based software applications, a current resource consumption level based upon the integrated application-level resource usage metrics for the cloud-based software application. The server computing device compares, for each of the one or more cloud-based software applications, the current resource consumption level to a desired resource consumption level for the cloud-based software application. The server computing device changes, for each of the one or more cloud-based software applications, one or more of: a CPU resource availability for the cloud-based software application, a memory resource availability for the cloud-based software application, a number of application containers in the cloud-based application, a latency score for the cloud-based software application, or a priority level for the cloud-based software application, based upon a difference between the current resource consumption level and the desired resource consumption level.

The invention, in another aspect, features a computerized method of coordinated scaling of a cloud-based software application and a backend resource in a networked computing environment. A server computing device captures resource usage metrics associated with one or more cloud-based software applications, each cloud-based software application comprising one or more application containers. The server computing device captures resource usage metrics associated with one or more backend resources that correspond to the one or more cloud-based software applications. The server computing device aggregates the resource usage metrics associated with the one or more cloud-based software applications and the resource usage metrics associated with the one or more backend resources to generate a set of integrated application-level resource usage metrics. The server computing device determines, for each of the one or more cloud-based software applications, a current resource consumption level based upon the integrated application-level resource usage metrics for the cloud-based software application. The server computing device compares, for each of the one or more cloud-based software applications, the current resource consumption level to a desired resource consumption level for the cloud-based software application. The server computing device changes, for each of the one or more cloud-based software applications, one or more of: a CPU resource availability for the cloud-based software application, a memory resource availability for the cloud-based software application, a number of application containers in the cloud-based software application, a latency score for the cloud-based software application, or a priority level for the cloud-based software application, based upon a difference between the current resource consumption level and the desired resource consumption level.

Any of the above aspects can include one or more of the following features. In some embodiments, the resource usage metrics associated with one or more cloud-based software applications comprise CPU usage data, memory usage data, network latency data, and a number of active application containers. In some embodiments, the resource usage metrics associated with one or more backend resources comprise connection count data, connection pool data, CPU usage data, memory usage data, and peak consumption cost data.

In some embodiments, aggregating the resource usage metrics associated with the one or more cloud-based software applications and the resource usage metrics associated with the one or more backend resources comprises: identifying, for each cloud-based software application, one or more resources of the backend resources being used by the cloud-based software application, based upon metadata associated with the cloud-based software application; and matching, for each cloud-based software application, the resource usage data associated with the identified resources of the backend resources to the resource usage data for the cloud-based software application. In some embodiments, the desired resource consumption level is based upon one or more resource consumption policies stored in a database coupled to the server computing device. In some embodiments, one or more of the resource consumption policies are specific to a cloud-based software application.

In some embodiments, the server computing device identifies one or more dependencies for each cloud-based application, the one or more dependencies comprising a second cloud-based application that provides data to the cloud-based application. In some embodiments, the server computing device changes one or more of: a CPU resource availability for the second cloud-based application, a memory resource availability for the second cloud-based application, a number of application containers in the second cloud-based application, or a priority level for the second cloud-based application, based upon the difference between the current resource consumption level and the desired resource consumption level.

In some embodiments, the priority level of the cloud-based software application comprises a flag indicating a priority at which the cloud-based software application should have access to computing resources. In some embodiments, the latency score of the cloud-based software application comprises a network latency tolerance value for the cloud-based software application. In some embodiments, the one or more backend resources comprises mainframe databases, cloud databases, or web services.

In some embodiments, the CPU resource availability for the cloud-based software application comprises an amount of CPU processing bandwidth usable by the cloud-based software application. In some embodiments, the CPU resource availability for the cloud-based software application comprises an amount of CPU processing bandwidth usable by each application container in the cloud-based software application. In some embodiments, the memory resource availability for the cloud-based software application comprises an amount of memory space usable by the cloud-based software application. In some embodiments, the memory resource availability for the cloud-based software application comprises an amount of memory space usable by each application container in the cloud-based software application.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
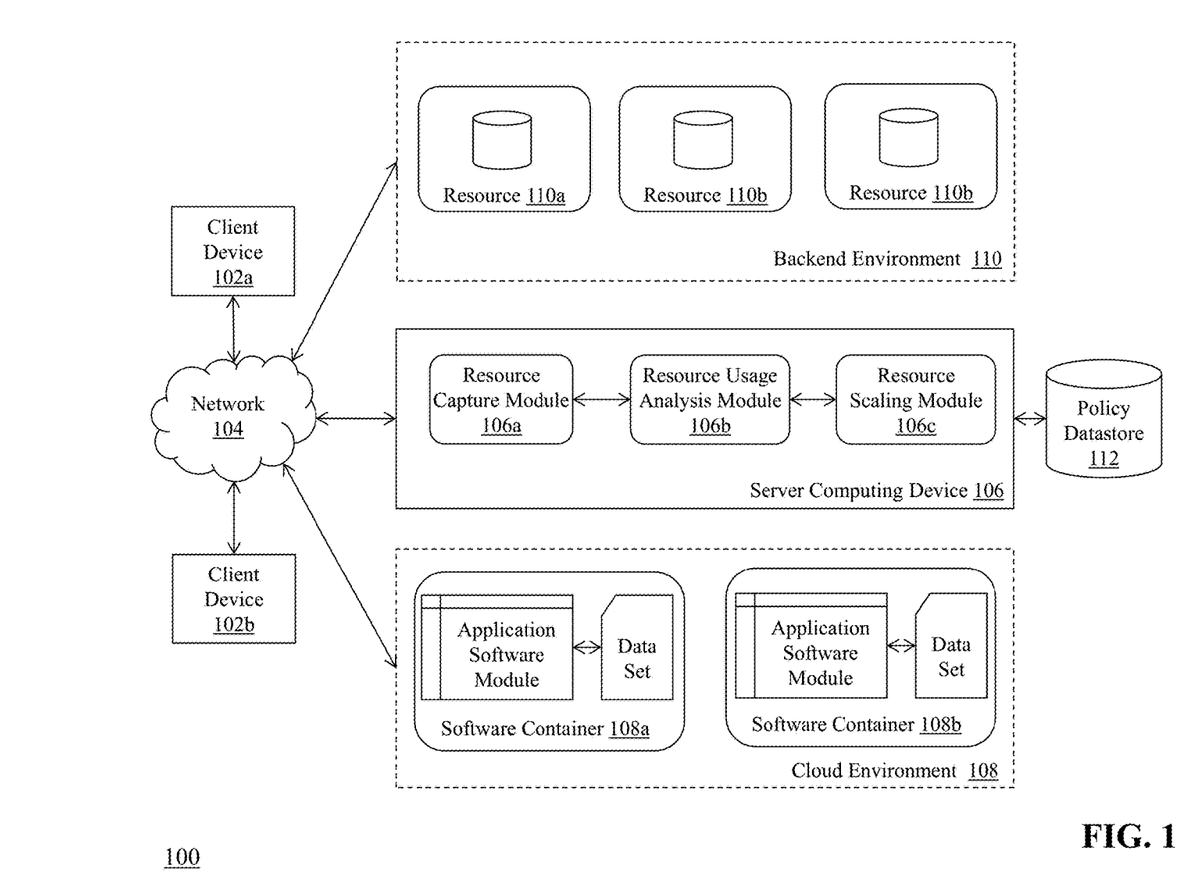
FIG. 1 is a block diagram of a system for coordinated scaling of a cloud-based application and a backend resource in a networked computing environment.

FIG. 1 is a block diagram of a system 100 for coordinated scaling of a cloud-based application and a backend resource in a networked computing environment. The system 100 includes a plurality of client computing devices 102a, 102b, a communications network 104, a server computing device 106 that includes a resource capture module 106a, a resource usage analysis module 106b, and a resource scaling module 106c, a cloud environment 108 that includes a plurality of software containers 108a, 108b, a backend environment 110 that includes a plurality of backend resources 110a-110c (e.g., mainframes, databases, other backend services), and a policy datastore 112.

The client computing devices 102a-102b connect to the communications network 104 in order to communicate with the cloud environment 108 to access one or more cloud-based software applications provided by the environment 108. For example, the client computing devices 102a-102b can access the cloud-based software applications using browser software or other local software that is configured to connect to the cloud environment via the communications network 104 (e.g., SaaS, PaaS, etc.). The client computing devices 102a-102b can be coupled to a display device (not shown), in which the client computing devices can provide a detailed graphical user interface (GUI) via the display device that presents output generated by use of the cloud-based software application.

Exemplary client computing devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client computing device 102, it should be appreciated that the system 100 can include any number of client computing devices.

The communication network 104 enables the other components of the system 100 to communicate with each other in order to perform the process of coordinated scaling of a cloud-based application and a backend resource in a networked computing environment as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware, including one or more special-purpose processors and one or more physical memory modules, and specialized software modules—such as modules 106a-106c—that are executed by a processor of the server computing device 106, to receive data from other components of the system 100, transmit data to other components of the system 100, and perform functions for coordinated scaling of a cloud-based application and a backend resource in a networked computing environment as described herein. In some embodiments, the modules 106a-106c are specialized sets of computer software instructions programmed onto a dedicated processor in the server computing device 106 and can include specifically-designated memory locations and/or registers for executing the specialized computer software instructions. Further explanation of the specific processing performed by the modules 106a-106c will be provided below.

Although the modules 106a-106c are shown in FIG. 1 as executing within the same server computing device 106, in some embodiments the functionality of the modules 106a-106c can be distributed among a plurality of server computing devices. As shown in FIG. 1, the server computing device 106 enables the modules 106a-106c to communicate with each other in order to exchange data for the purpose of performing the described functions. It should be appreciated that any number of computing devices, arranged in a variety of architectures, resources, and configurations (e.g., cluster computing, virtual computing, cloud computing) to perform the functions of the server computing device 106.

Similarly, the cloud environment 108 comprises a combination of hardware, including one or more special-purpose processors and one or more physical memory modules, and specialized software—such as software containers 108a-108b—that are executed by one or more processors of the cloud environment 108, to receive data from other components of the system 100, transmit data to other components of the system 100, and provide application functionality to end users as described herein. In some embodiments, the software containers 108a-108b comprise a software module (i.e., software code files, environment variables, libraries, other dependencies, and the like) and a data set (i.e., data files and/or a local database). The cloud environment 108 can be configured to execute many software containers, in isolation from each other, that access a single operating system (OS) kernel. The cloud environment 108 can execute each software container in a separate OS process, and constrain each container's access to physical resources (e.g., CPU, memory) of the server computing device so that a single container does not utilize all of the available physical resources. Upon execution, the server computing device 108 executes the software application code stored in the container, which in turn accesses the data set stored in the container, for presentation of the data set (e.g., via UI elements) on a client computing device 102a, 102b. The cloud environment 108 can be configured to scale horizontally (e.g., create new instances of applications) as needed, based upon the demand received from the client devices 102a, 102b. In one embodiment, the cloud environment 108 utilizes the Kubernetes™ container deployment platform to deploy, manage, and scale the containerized applications. The server computing device 106 can interface with the cloud environment 108 (e.g., via the Kubernetes Pod Autoscaler API functionality, described at https://kubernetes.io/docs/tasks/run-application/horizontal-pod-autoscale/) in order to provide customized scaling commands as will be described herein. It should be appreciated that other customized or commercially-available container orchestration platforms (e.g., Apache Mesos™, Boxfuse™) can be used within the scope of invention.

The backend environment 110 comprises a combination of hardware, including one or more special-purpose processors and one or more physical memory modules, and specialized software—such as resources 110a, 110b, 110c—that are executed by one or more processors of the backend environment 110, to receive data from other components of the system 100, transmit data to other components of the system 100, and provide resource support (e.g., data processing, disk storage, etc.) to one or more software applications hosted in the cloud environment 108 as described herein. In some embodiments, one or more of the resources 110a-110c is a mainframe computing system that can perform application-critical data processing and storage for one or more applications in the cloud environment 108. For example, resource 110a can be a DB2™ database application running on the mainframe system.

The policy datastore 112 comprises transient and/or persistent memory for data storage, that is used in conjunction with coordinated scaling of a cloud-based application and a backend resource in a networked computing environment as described herein. Generally, the policy datastore 112 is configured to receive, generate, and store specific segments of data relating to resource scaling preferences and limits in each of the cloud environment 108 and backend environment 110. In some embodiments, all or a portion of the policy datastore 112 can be integrated within the server computing device 106, or be located on a separate computing device or devices. For example, the policy datastore 112 can comprise a database such as MySQL™ available from Oracle Corp. of Redwood City, Calif.

Figure 2:
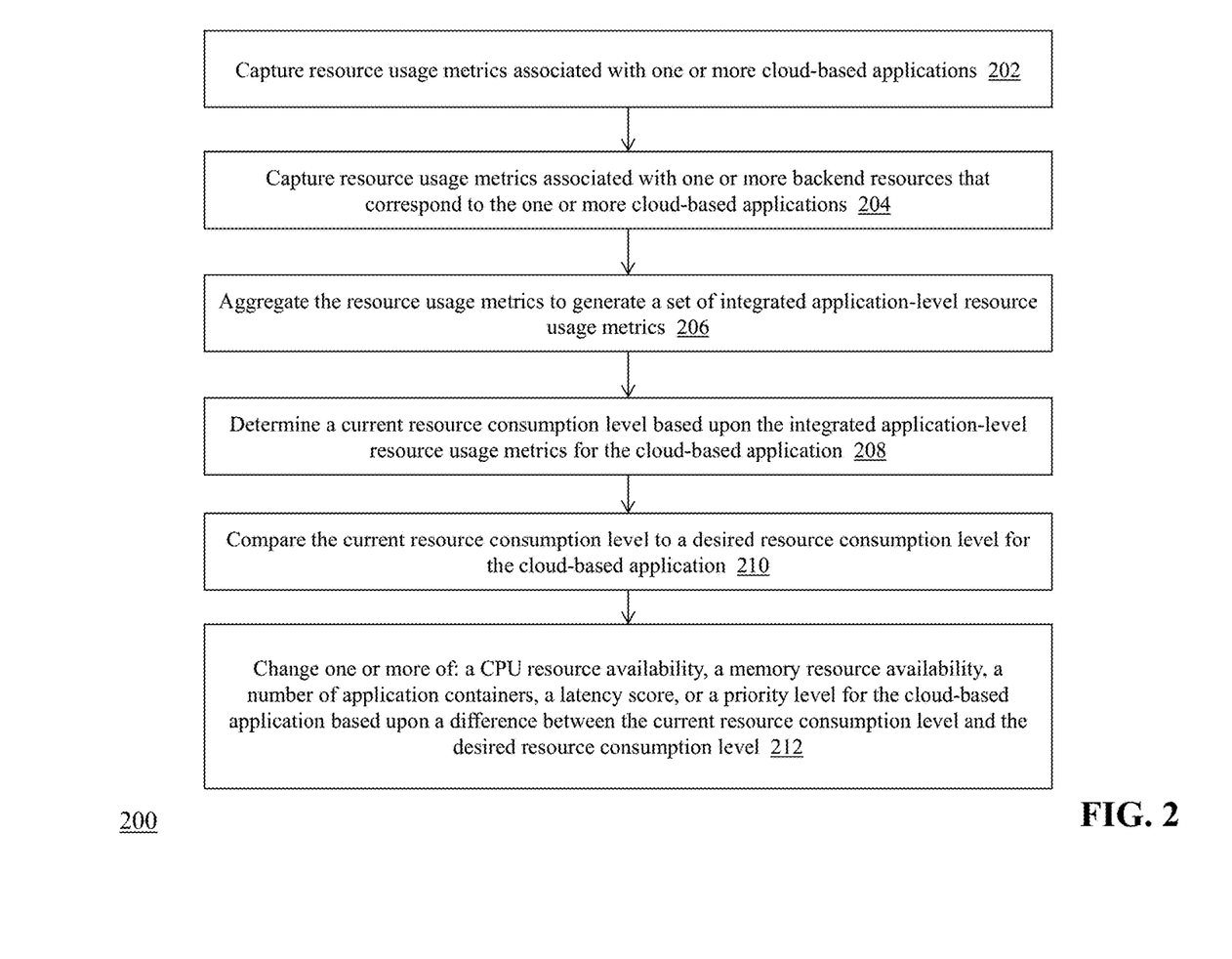
FIG. 2 is a flow diagram of a computerized method of coordinated scaling of a cloud-based application and a backend resource in a networked computing environment.

FIG. 2 is a flow diagram of a computerized method 200 of coordinated scaling of a cloud-based application and a backend resource in a networked computing environment, using the system 100 of FIG. 1. One or more users at client computing devices 102a, 102b connect to the cloud environment 108 in order to access one or more software applications provided by the cloud environment. The cloud environment 108 responds to the user access requests by launching one or more software containers 108a, 108b that provide the requested applications to the end users. As part of providing the application functionality, the cloud environment 108 utilizes one or more backend resources 110a-110c in the backend environment 110 (e.g., for data retrieval and processing that supports the software application).

During this process, the resource capture module 106a of server computing device 106 captures (202) resource usage metrics associated with one or more of the cloud-based applications in use by the client computing devices 102a, 102b. For example, the resource capture module 106a can communicate with the software container orchestration platform (i.e., Kubernetes™) that manages the cloud environment 108 resources using a programmatic interface, such as an API, in order to collect relevant resource usage metrics associated with execution and use of the software containers 108a, 108b. Exemplary resource usage metrics captured from the cloud environment 108 include, but are not limited to, CPU usage data for each of the one or more software containers 108a, 108b, memory usage data for each of the one or more software containers 108a, 108b, CPU usage data for one or more host processors within the cloud environment 108, memory usage data for one or more host processors within the cloud environment 108, network latency data, and a count of active application containers. The resource capture module 106a can transmit the captured resource usage metrics to the resource usage analysis module 106b. The resource capture module 106a can also determine whether a particular software application has one or more dependencies on, or relationships with, other applications. As will be described herein, the server computing device 106 can utilize this information to determine how to scale certain applications or services (e.g., some applications, due to dependencies, may need to be scaled in tandem, or some applications may rely on the same backend resource, so scaling them independently may result in undesirable impacts on the backend environment).

Also, each software application in the cloud environment 108 can be classified to indicate the application's importance and priority in the overall application ecosystem. In one example, each software application can include an RTO level (e.g., A, B, C or Tier 0, Tier 1, Tier 2) that indicates the recovery time objective for the application—such that enterprise-critical applications are rated higher than less-important applications. In another example, each software application can include a latency score, which is a measure that corresponds to the latency needs of the application and the importance of keeping application latency within a desired threshold—i.e., enterprise-critical and/or time-sensitive applications (e.g., trading, data-based transactions) may require lower latency than other applications. In another example, each software application can be assigned a flag that indicates whether the application is part of a 'vital few' applications or transactions that must be maintained. As will be explained herein, the server computing device 106 can use these application classifications when determining how to adjust resource scaling in the cloud environment and/or the backend environment.

The resource capture module 106a of server computing device 106 also captures (204) resource usage metrics associated with one or more backend resources (e.g., resources 110a-110c) that correspond to the one or more cloud-based applications. For example, the resource capture module 106a can communicate with a web service (e.g., IBM® WebSphere™ MQ publisher) hosted in the backend environment 110 that pushes the resource usage metrics from the computing devices in the backend environment 110 to the resource capture module 106a. Exemplary resource usage metrics captured from the backend environment 110 include, but are not limited to, connection count data, connection pool data, CPU usage data, memory usage data, wait times/latency data, queue depth data, and peak consumption cost data. The resource capture module 106a can transmit the captured resource usage metrics to the resource usage analysis module 106b.

The resource usage analysis module 106b receives the captured resource usage data for each of the cloud environment 108 and backend environment 110, and the module 106b aggregates (206) the resource usage metrics associated with the one or more cloud-based applications and the resource usage metrics associated with the one or more backend resources to generate a set of integrated application-level resource usage metrics. For example, the resource usage analysis module 106b can identify, for each cloud-based application, one or more resources of the backend resources being used by the cloud-based application, based upon metadata associated with the cloud-based application. Based on the identification of certain backend resources being used by a particular cloud-based application, the resource usage analysis module 106b can match the resource usage data for those backend resources (e.g., through an application profile or other identifier) to the resource usage data for the cloud-based application—thereby providing a robust view of the overall resource impact of the software application on both the cloud environment 108 and the backend environment 110.

The resource usage analysis module 106b determines (208), for each of the one or more cloud-based software applications, a current resource consumption level based upon the integrated application-level resource usage metrics for the cloud-based application. For example, one software application may utilize a certain level of CPU and memory resources in the cloud environment, while also requiring a specific amount of CPU and memory resources in the backend environment. The resource usage analysis module 106b aggregates this information together to determine a current resource consumption level that provides a full picture of the resource consumption of a particular software application on the entire networked computing environment. It should be appreciated that, in some embodiments, the current resource consumption level comprises a plurality of individual metrics and/or attributes that are indicative of the impact that a software application has on the computing environment.

The resource usage analysis module 106b compares (210), for each of the one or more cloud-based software applications, the current resource consumption level to a desired resource consumption level for the cloud-based application. As indicated above, the policy datastore 112 can comprise one or more resource consumption policies associated with one or more of the cloud-based software applications, and the resource usage analysis module 106b can use the resource consumption policies to determine whether the resource consumption for a software application is within a desired threshold. For example, a cloud-based application may be classified with a latency score that requires the application to have very low latency when performing data transactions. The corresponding resource consumption policy for the application can define a particular latency threshold or value for the application. However, the usage metrics captured by the resource capture module 106a may indicate that the currently-running instance of the software application is operating with a latency that exceeds the acceptable latency threshold as defined in the resource consumption policy. Therefore, changes to the resource scaling in the cloud environment 108 and/or the backend requirement 110 may be required in order to, e.g., provide additional bandwidth, networking, or data processing resources to the software application in order to get the application's latency back within the desired threshold.

As a result of the comparison step, the resource scaling module 106c of server computing device 106 changes (212), for each of the one or more cloud-based applications, one or more of: a CPU resource availability for the cloud-based application, a memory resource availability for the cloud-based application, a number of application containers in the cloud-based application, a latency score for the cloud-based application, or a priority level for the cloud-based application, based upon a difference between the current resource consumption level and the desired resource consumption level. Using the above example, the resource scaling module 106c receives an indication from the resource usage analysis module 106b that the latency for a particular cloud-based software application exceeds the desired latency value as defined in a policy for the application. The resource scaling module 106c then determines that one or more resources (e.g., CPU, memory, networking bandwidth) in the cloud environment 108 and/or the backend environment 110 should be changed so that the latency for the application returns to an acceptable level, based upon the policy. For example, the resource scaling module 106c can instruct the cloud environment 108 (e.g., via the programmatic interface described above) to launch additional software containers, increase the amount of memory and/or CPU resources allotted to the software application, or provide other scaling actions that improve the latency of the application.

Figure 3:
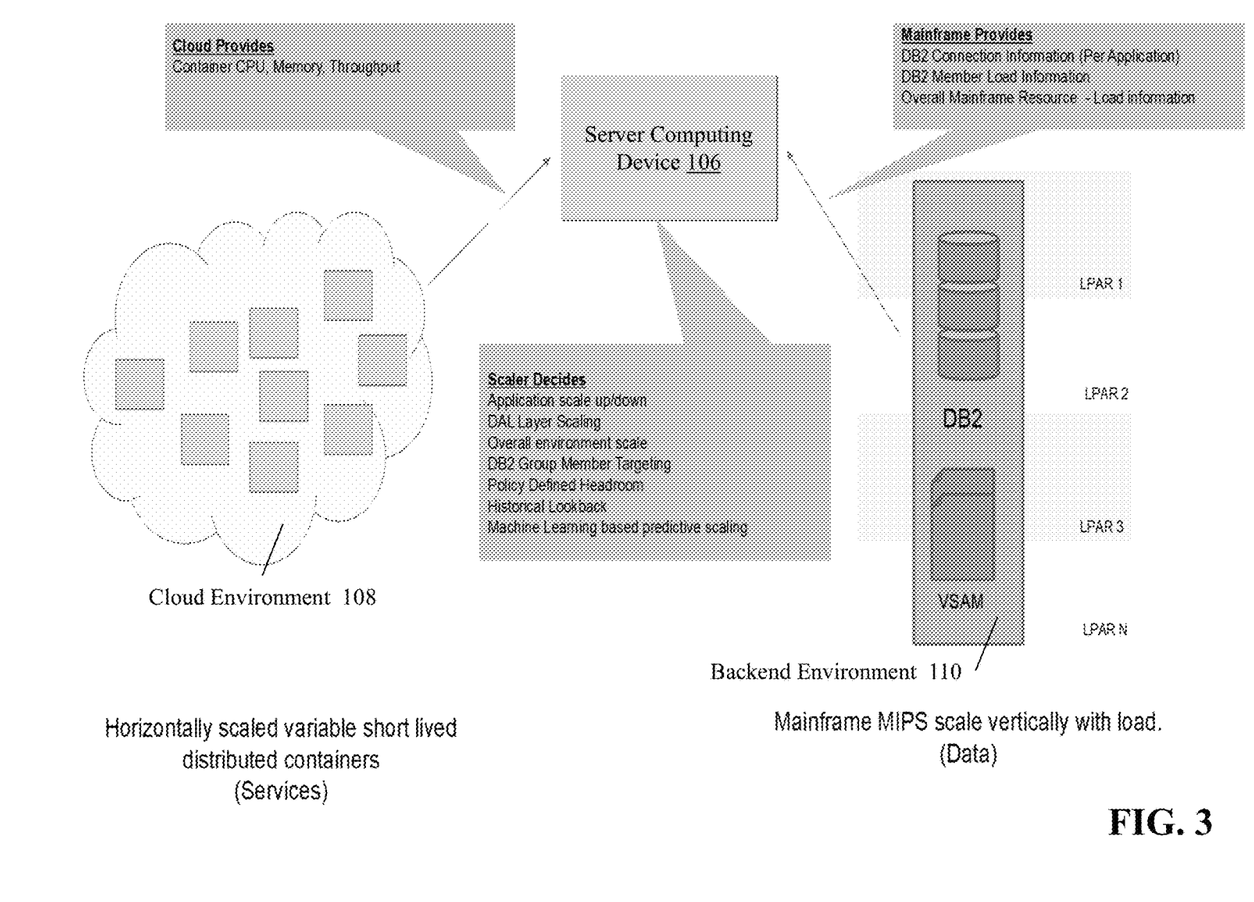
FIG. 3 is a detailed flow diagram of a system for coordinated scaling of a cloud-based application and a backend resource in a networked computing environment.

FIG. 3 is a detailed flow diagram of the system 100 of FIG. 1 for coordinated scaling of a cloud-based application and a backend resource in a networked computing environment. As shown in FIG. 3, the cloud environment 110 and backend environment 108 are coupled to each other via server computing device 106. The server computing device 106 obtains certain metadata from the cloud environment 108 about the operation and execution of software containers in the environment—such as, e.g., container CPU usage, memory usage, throughput, etc. Similarly, the server computing device 106 obtains certain metadata from the backend environment 110 about the operation of the data resources—such as, e.g., connection information (per application), load information and overall mainframe resource and load information. The server computing device 106, via the resource scaling module 106c as described herein, uses the metadata to make a plurality of scaling decisions—such as e.g., application scaling up/down, DAL layer scaling, overall environment scaling, group member targeting, policy-defined headroom, historical look back, and in some embodiments, machine-learning based predictive scaling.

In some embodiments, the resource scaling module 106c can consider additional types of metadata about the operation and execution of the software applications when generating the scaling instructions for the cloud environment 108 and/or the backend environment 110:

Network

In some embodiments, the resource capture module 106a, the resource usage analysis module 106b and/or the resource scaling module 106c can tag application metadata with a network latency SLA. This SLA in times of congestion may be used to ramp down other lower SLA applications, while keeping their main SLAs intact. The modules of the server computing device 106 may do this to relieve network congestion for other software applications. The congestion could either be occurring in the front end incoming traffic or more likely to the backend constrained resources.

Backend Costs

Some backend resource costs change based on the real-time peak consumption of the resource. The resource capture module 106a, the resource usage analysis module 106b and/or the resource scaling module 106c can monitor that cost and mitigate the need by balancing down applications more aggressively in favor of others.

Prioritization

In some embodiments, applications can be coded with a high level priority. This is intended as a primary score for the server computing device 106, as representing the application's level of importance in the overall scheme of applications. The server computing device 106 can focus on these applications above others with respect to scaling decisions in times of severe congestion or conflict. This is especially critical if backend resources go down or other capacity is lost.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for coordinated scaling of a cloud-based software application and a backend resource in a networked computing environment, the system comprising a server computing device having a memory that stores computer-executable instructions and a processor that executes the computer-executable instructions to:

capture usage metrics associated with one or more cloud-based software applications, each cloud-based software application comprising one or more application containers;

capture usage metrics associated with one or more backend resources being used by the one or more cloud-based software applications;

aggregate the usage metrics associated with the one or more cloud-based software applications and the usage metrics associated with the one or more backend resources to generate a set of integrated application-level usage metrics, comprising:

identifying, for each cloud-based software application, one or more resources of the backend resources being used by the cloud-based software application, based upon metadata associated with the cloud-based software application, and matching, for each cloud-based software application, the usage metrics associated with the identified resources of the backend resources to the usage metrics for the cloud-based software application;

determine, for each of the one or more cloud-based software applications, a current resource consumption level based upon the integrated application-level resource usage metrics for the cloud-based software application;

compare, for each of the one or more cloud-based software applications, the current resource consumption level to a desired resource consumption level for the cloud-based software application; and change, for each of the one or more cloud-based software applications, one or more of: a CPU resource availability for the cloud-based software application, a memory resource availability for the cloud-based software application, a number of application containers in the cloud-based software application, a latency score for the cloud-based software application, or a priority level for the cloud-based software application, based upon a difference between the current resource consumption level and the desired resource consumption level.

2. The system of claim 1, wherein the usage metrics associated with one or more cloud-based software applications comprise CPU usage data, memory usage data, network latency data, and a number of active application containers.

3. The system of claim 1, wherein the usage metrics associated with one or more backend resources comprise connection count data, connection pool data, CPU usage data, memory usage data, and peak consumption cost data.

4. The system of claim 1, wherein the desired resource consumption level is based upon one or more resource consumption policies stored in a database coupled to the server computing device.

5. The system of claim 4, wherein one or more of the resource consumption policies are specific to a cloud-based software application.

6. The system of claim 1, wherein the server computing device identifies one or more dependencies for each cloud-based software application, the one or more dependencies comprising a second cloud-based software application that provides data to the cloud-based software application.

7. The system of claim 6, wherein the server computing device changes one or more of: a CPU resource availability for the second cloud-based software application, a memory resource availability for the second cloud-based software application, a number of application containers in the second cloud-based software application, or a priority level for the second cloud-based software application, based upon the difference between the current resource consumption level and the desired resource consumption level.

8. The system of claim 1, wherein the priority level of the cloud-based software application comprises a flag indicating a priority at which the cloud-based software application should have access to computing resources.

9. The system of claim 1, wherein the latency score of the cloud-based software application comprises a network latency tolerance value for the cloud-based software application.

10. The system of claim 1, wherein the one or more backend resources comprises mainframe databases, cloud databases, and/or web services.

11. The system of claim 1, wherein the CPU resource availability for the cloud-based software application comprises an amount of CPU processing bandwidth usable by the cloud-based software application.

12. The system of claim 11, wherein the CPU resource availability for the cloud-based software application comprises an amount of CPU processing bandwidth usable by each application container in the cloud-based software application.

13. The system of claim 1, wherein the memory resource availability for the cloud-based software application comprises an amount of memory space usable by the cloud-based software application.

14. The system of claim 13, wherein the memory resource availability for the cloud-based software application comprises an amount of memory space usable by each application container in the cloud-based software application.

15. A computerized method of coordinated scaling of a cloud-based software application and a backend resource in a networked computing environment, the method comprising:

capturing, by a server computing device, usage metrics associated with one or more cloud-based software applications, each cloud-based software application comprising one or more application containers;

capturing, by the server computing device, usage metrics associated with one or more backend resources that being used by the one or more cloud-based software applications;

aggregating, by the server computing device, the usage metrics associated with the one or more cloud-based software applications and the usage metrics associated with the one or more backend resources to generate a set of integrated application-level usage metrics, comprising:

identifying, for each cloud-based software application, one or more resources of the backend resources being used by the cloud-based software application, based upon metadata associated with the cloud-based software application, and matching, for each cloud-based software application, the usage data associated with the identified resources of the backend resources to the usage data for the cloud-based software application;

determining, by the server computing device for each of the one or more cloud-based software applications, a current resource consumption level based upon the integrated application-level usage metrics for the cloud-based software application;

comparing, by the server computing device for each of the one or more cloud-based software applications, the current resource consumption level to a desired resource consumption level for the cloud-based software application; and changing, by the server computing device for each of the one or more cloud-based software applications, one or more of: a CPU resource availability for the cloud-based software application, a memory resource availability for the cloud-based software application, a number of application containers in the cloud-based software application, a latency score for the cloud-based software application, or a priority level for the cloud-based software application, based upon a difference between the current resource consumption level and the desired resource consumption level.

16. The method of claim 15, wherein the usage metrics associated with one or more cloud-based software applications comprise CPU usage data, memory usage data, network latency data, and a number of active application containers.

17. The method of claim 15, wherein the usage metrics associated with one or more backend resources comprise connection count data, connection pool data, database CPU usage data, database memory usage data, and peak consumption cost data.

18. The method of claim 15, wherein the desired resource consumption level is based upon one or more resource consumption policies stored in a database coupled to the server computing device.

19. The method of claim 18, wherein one or more of the resource consumption policies are specific to a cloud-based software application.

20. The method of claim 15, wherein the server computing device identifies one or more dependencies for each cloud-based software application, the one or more dependencies comprising a second cloud-based software application that provides data to the cloud-based software application.

21. The method of claim 20, wherein the server computing device changes one or more of: a CPU resource availability for the second cloud-based software application, a memory resource availability for the second cloud-based software application, a number of application containers in the second cloud-based software application, or a priority level for the second cloud-based software application, based upon the difference between the current resource consumption level and the desired resource consumption level.

22. The method of claim 15, wherein the priority level of the cloud-based software application comprises a flag indicating a priority at which the cloud-based software application should have access to computing resources.

23. The method of claim 15, wherein the latency score of the cloud-based software application comprises a network latency tolerance value for the cloud-based software application.

24. The method of claim 15, wherein the one or more backend resources comprises mainframe databases, cloud databases, and/or web services.

25. The method of claim 15, wherein the CPU resource availability for the cloud-based software application comprises an amount of CPU processing bandwidth usable by the cloud-based software application.

26. The method of claim 25, wherein the CPU resource availability for the cloud-based software application comprises an amount of CPU processing bandwidth usable by each application container in the cloud-based software application.

27. The method of claim 15, wherein the memory resource availability for the cloud-based software application comprises an amount of memory space usable by the cloud-based software application.

28. The method of claim 27, wherein the memory resource availability for the cloud-based software application comprises an amount of memory space usable by each application container in the cloud-based software application.

* * * * *